United States Patent Office 2,912,384
Patented Nov. 10, 1959

2,912,384

GLYCOL EXTRACT AND WATER-BASED HYDRAULIC FLUID CONTAINING THE SAME

Ernest R. Vierk, Lansing, and Thomas J. Smollett, Harvey, Ill., assignors to Sinclair Refining Company, New York, N.Y., a corporation of Maine No Drawing. Application June 28, 1956
Serial No. 594,377

8 Claims. (Cl. 252—74)

This invention relates to fire-resistant fluid compositions suitable for use in hydraulic devices adapted for transfer of mechanical energy, such as hydraulic brakes, shock absorbers and analogous equipment.

Hydraulic fluid compositions for use in transferring mechanical energy by fluid pressure should be non-injurious to systems which employ rubber, aluminum and other sensitive materials. It is also important that such compositions have a low change of viscosity over the range of temperatures employed as well as a suitable viscosity for use in hydraulic systems wherein wide temperature ranges prevail. Another important property, in addition to those above mentioned, which a hydraulic fluid should have is that of non-flammability. However, in hydraulic fluids which depend upon water for fire resistance, much difficulty has been experienced in obtaining a fluid suitable for use under conditions requiring high ignition temperature since the viscosity of the fluid is critically dependent upon water content and a slight evaporation of water lowers the viscosity index and upsets the fire resistant character of the fluid.

For example, if a water-based hydraulic fluid were used in the typical industrial hydraulic system, evaporation of the water, as occasioned by elevated temperatures encountered in service, would require frequent inspection and adjustment of the fluid to maintain the viscosity in the operable range. Moreover, drops of fluid which splash onto reservoir walls, or on any other isolated surface, would lose water and thereby form very objectionable sticky or tacky residues which could interfere with the hydraulic operation. Consequently, while efforts to improve such fluid compositions have been successful in some instances, quite frequently these compositions do not possess favorable viscosity characteristics, wide temperature ranges of clarity, and ignition temperatures above ordinary petroleum hydraulic oils.

In the present invention we have discovered a new and useful water-based hydraulic fluid composition characterized by a desirable viscosity-water content relationship, a wide temperature range of clarity and high ignition temperature. In accordance with our invention, a water-based fire-resistant hydraulic fluid which is characterized by the above-noted properties is prepared by combining about 1 to 5 parts by weight of water with about 9 to 5 parts by weight of an extract fraction obtained by extracting about 0.8 to 2.5 parts by weight of a petroleum sodium sulfonate-petroleum oil mixture with about 1 part by weight of ethylene glycol. The petroleum sodium sulfonate-petroleum oil mixture contains about 0.3 to 1.0 part of sulfonate to about 0.5 to 1.5 parts of oil, and generally the extract layer will be comprised of about 1 to 3 parts of the sodium sulfonate, about 0.7 to 2 parts of petroleum oil and about 3 to 5 parts of ethylene glycol. The extraction may be carried out in an ordinary stirrer equipped kettle or other suitable apparatus and temperatures between about 175 to 250° F., are advantageous. Preferably, the temperature of extraction is within the range of about 200 to 230° F. The temperature does not seem important from a functional standpoint, e.g. temperatures of about 75 to 270° F. have been employed without materially affecting the extraction as to yield and character of the product. On the other hand, the use of high temperatures necessitates excessive heating costs while the use of low temperatures involves long separating times. As examples, the extract separating time at 77° F. was 570 minutes while only 25 minutes were required at 270° F. The extract layer recovered which contains ethylene glycol, sodium sulfonate and mineral oil, can be subsequently mixed with the desired amount of water to obtain the hydraulic fluid compositions of this invention.

The petroleum sulfonates employed in the present invention are the oil-soluble sodium salts derived from sulfonic acids produced by the treatment of a petroleum oil with sulfuric acid. The oil-soluble sodium sulfonates can be employed as a concentrate in the oil from which they are derived and may be prepared by sulfonating a suitable petroleum distillate with sulfuric acid followed by neutralization of the oil phase with aqueous sodium hydroxide to obtain a dilute sodium sulfonate. The mixture is then alcohol extracted to recover a concentrate of petroleum sodium sulfonate in petroleum oil. The petroleum oil component of our compositions is of lubricating viscosity and is preferably a naphthene base oil of about 50 to 2000 SUS at 100° F. viscosity. In the extraction procedure any diluent oil in the sulfonate is considered as oil and thus the amount of sulfonate is specified on a dry soap basis. When the sulfonate is produced as a 40% concentrate in oil, this concentrate can be extracted without addition or removal of any oil.

The use of oil-soluble petroleum sodium sulfonates in the water-based hydraulic compositions of this invention has the advantages of abundance, relatively low cost and the ability to thicken water by virtue of forming hydrophilic colloidal dispersions. However, if a mixture containing merely the sodium sulfonate, mineral oil and water were used in the typical hydraulic system, the aforementioned difficulties of water evaporation, sticky residue, etc. would necessitate periodic inspection to maintain the viscosity in an operable range due to the critical relationship between viscosity and water content of such mixtures. In the composition of the present invention the use of the ethylene glycol extract with water as the dispersion medium for the sulfonate material affords improved viscosity-water content relationships since the ethylene glycol, which is relatively non-volatile at normal operating temperatures for water-based fluids, will dilute any extract residue even if the water evaporates entirely. With increased glycol content the tendency of sulfonate to gel in the dispersion medium is lessened considerably. However, the mere addition of sufficient glycol to impart a desired viscosity will result in compositions which are clear only in a restrictive temperature range and which exhibit inadequate viscosity-water content relationships. For example, if a 40% concentrate of sodium sulfonate in mineral oil were mixed with ethylene glycol and water to make a dispersion having a viscosity of approximately 200 SUS at 100° F., the maximum glycol content which could be tolerated for the fluid to be clear between room temperature and 140° F. is about 9% by weight, an amount insufficient to impart an adequate viscosity-water content relationship.

The glycol extract prepared as described above can be stored, shipped or otherwise maintained until such time as water is added to obtain the final hydraulic composition. The amount of water added to the ethylene glycol-sulfonate extract may vary between about 1 and 5 parts by weight of water for 9 to 5 parts by weight of extract material. Preferably, we mix about 3 to 4 parts of water with about 6 to 7 parts of extract. The extract or the final water-based fluid might contain a quantity of unextracted petroleum oil or other ingredients such as corrosion inhibitors, oiliness agents, etc., as long as the desired properties are not unduly deleteriously affected. Good results from the standpoint of lessened inflammability and other desirable properties, such as clarity and viscosity, can be obtained by adding 3.3 parts by weight of water to a hydraulic base fluid prepared by extracting 6 parts by weight of petroleum sodium sulfonate (40% concentration of a soap in diluent oil) with 4 parts by weight of ethylene glycol. The extract layer comprises the following composition in parts by weight:

Sodium petroleum sulfonate _____ 2.0
Mineral oil _____ 1.3
Ethylene glycol _____ 3.3

The following data lists the result of several glycol extractions. The extracts were mixed with varying percentages of water for viscosity and clarity range determination. The results are listed in Table I below. On a dry soap basis, the petroleum sodium sulfonate contained approximately 40% by weight of oil-soluble petroleum sodium sulfonate derived by sulfuric acid sulfonation of a naphthenic base neutral lubricating oil having a viscosity of 700 SUS at 100° F.

TABLE I

*Ethylene glycol extraction soda-water sulfonate*

| Extraction | A | B | C | D |
|---|---|---|---|---|
| Conditions: | | | | |
| Percent glycol | 20 | 33⅓ | 40 | 50. |
| Percent sulfonate | 80 | 66⅔ | 60 | 50. |
| Temperature, ° F | 240 | 190 | 205 | 210. |
| Extract layer: | | | | |
| Yield, weight percent | 84 | 77.5 | 79.7 | 82.0 |
| Specific gravity, 60/60 | 1.0796 | 1.1075 | 1.1133 | 1.1179. |
| SO₄ Ash | 7.13 | 6.44 | 5.91 | 4.86. |
| Viscosity, SUS: | | | | |
| at 100° F | 4,054 | 2,110 | 1,350.9 | 594.1. |
| at 210° F | 183.3 | 120.1 | 93.72 | 66.58. |
| Viscosity index | 84.4 | 108 | 76.7 | 89.6. |
| Color | Dark | Dark | Dark | Dark. |

| Properties of Extract-Water Dispersions | | Vis. at 100° F. | Clarity Range, ° F. | Vis. at 100° F. | Clarity Range, ° F. | Vis. at 100° F. | Clarity Range, ° F. | Vis. at 100° F. | Clarity Range, ° F. |
|---|---|---|---|---|---|---|---|---|---|
| Percent (weight) extract | Percent (weight) water | | | | | | | | |
| 90 | 10 | | | 1,363 | <35-BP | 836.2 | <35-BP | 344.2 | <35-BP |
| 80 | 20 | | | | | 502.2 | <35-BP | 186.2 | <35-BP |
| 70 | 30 | | | 615.9 | 45-BP | 299.7 | <35-BP | 106.5 | <35-BP |
| 60 | 40 | 1,757 | 85-BP | 322.6 | 64-BP | 137.0 | 46-BP | 63.52 | <35-BP |
| 50 | 50 | 342.9 | 110-GP | 115.5 | 104-BP | 82.06 | 85-BP | | |
| 40 | 60 | 87.52 | 108-GP | 50.12 | 127-BP | | | | |
| 30 | 70 | 42.55 | <35-BP | | | | | | <35-BP |

| 210 SUS at 100° F. vis. dispersion: | | | | |
|---|---|---|---|---|
| Percent (weight) water | 54.0 | 44.5 | 34.0 | 18.0 |
| Clarity range, ° F | 110 to boiling point plus. | 80 to boiling point plus. | 35 to boiling point plus. | 35 to boiling point plus. |

Of the extracts of Table I, only A is not within the present invention, and the viscosity-water content characteristics of this extract are markedly inferior to those of extracts B, C and D. For example, a mixture of 50% water and 50% extract A had a viscosity of 432.9 and yet with the use of 40% water the viscosity was 1757. Thus, the viscosity of compositions of extract A are very sensitive to water content. On the other hand, the viscosity of compositions of extract B went only from 115.5 to 322.6 as the water content was lowered from 50 to 40%. For similar water contents the compositions of extract C ranged in viscosity from 82.06 to 137, and for water contents of 40 to 30%, the viscosity of compositions of extract D went from 63.52 to 106.4. Thus, the viscosities of compositions of our invention are relatively insensitive to changes in water content.

In Table II, the ASTM D-286-30 autogenous ignition temperature test was used to evaluate the fire resistance of water-based hydraulic compositions made in accordance with the present invention. This test procedure determines the minimum temperature required for spontaneous ignition of the test fluid under specified conditions. The data summarized in Table II show that hydraulic compositions prepared in accordance with the present invention have excellent viscosities, wide temperature ranges of clarity, and fire resistances superior to ordinary petroleum hydraulic oil and to two commercial water-based fire-resistant hydraulic fluids.

TABLE II
Properties of hydraulic fluids

| | Fluids | | | Commercial Water-Based Fire-Resistant Hydraulic Fluids | | Petroleum Hydraulic Oil [1] |
|---|---|---|---|---|---|---|
| | E | F | G | H | I | J |
| Ingredients, Wt. Percent: | | | | | | |
| Glycol Extract C of Table I (Prepared from 40% glycol+60% sulfonate) | 80 | 67 | 55 | | | |
| Water | 20 | 33 | 45 | | | |
| Composition, Wt. Percent (Calculated): | | | | | | |
| Percent Sodium Petroleum Sulfonate | 24.15 | 20.13 | 16.60 | | | |
| Percent Oil | 15.85 | 13.37 | 10.90 | | | |
| Percent Ethylene Glycol | 40.00 | 33.50 | 27.50 | | | |
| Percent Water | 20.00 | 33.00 | 45.00 | 34.1 | 48.5 | |
| Properties: | | | | | | |
| Viscosity, SUS at 100° F | 502 | 230 | 94 | 206 | 204 | 207 |
| Clarity Range, ° F | <35->212 | <35->212 | 65->212 | | | |
| Autogenous Ignition Temp., ° F | 973 | 984 | 986 | 936 | 916 | 815 |

[1] Neutral oil of 200 SUS at 100° F., and 95 V.I.

We claim:

1. A fluid glycol extract composition consisting essentially of about 1 to 3 parts of a petroleum sodium sulfonate, about 0.7 to 2 parts of petroleum oil of lubricating viscosity and about 3 to 5 parts of ethylene glycol, obtained by extracting about .8 to 2.5 parts by weight of a petroleum sodium-sulfonate-petroleum oil mixture with about one part by weight of glycol, said mixture consisting essentially of about 0.3 to 1.0 part by weight of sulfonate and about 0.5 to 1.5 parts by weight of petroleum oil of lubricating viscosity.

2. A fire-resistant hydraulic fluid consisting essentially of about 1 to 5 parts by weight of water and about 9 to 5 parts by weight of the extract of claim 1.

3. The composition of claim 1 in which the petroleum oil is a naphthene base oil having a viscosity of about 50 to 2000 SUS at 100° F.

4. A fire-resistant hydraulic fluid consisting essentially of about 3 to 4 parts by weight of water and about 6 to 7 parts by weight of the extract of claim 3.

5. In a method of preparing a fluid extract composition, which can be mixed with water to make a fire-resistant hydraulic fluid, the steps which comprise extracting about 0.8 to 2.5 parts by weight of a petroleum sodium sulfonate-petroleum oil mixture with about 1 part by weight of ethylene glycol at a temperature from about 175 to 250° F., and thereafter recovering the ethylene glycol extract phase, said mixture consisting essentially of about 0.3 to 1.0 part by weight of sulfonate and about 0.5 to 1.5 parts by weight of petroleum oil of lubricating viscosity.

6. The method of claim 5 wherein the temperature is from about 200 to 230° F. and said petroleum oil is a naphthene base oil having a viscosity of about 50 to 2000 SUS at 100° F.

7. In a method of preparing a fire-resistant hydraulic fluid, the steps which comprise extracting about 0.8 to 2.5 parts by weight of petroleum sodium sulfonate-petroleum oil mixture with about 1 part by weight of ethylene glycol at a temperature from about 175 to 250° F. to produce an ethylene glycol extract phase, said mixture consisting essentially of about 0.3 to 1.0 part by weight of sulfonate and about 0.5 to 1.5 parts by weight of petroleum oil of lubricating viscosity, recovering said extract phase, and thereafter mixing about 1 to 5 parts by weight of water with about 9 to 5 parts by weight of said extract.

8. The method of claim 7 wherein the temperature is from about 200 to 230° F., said petroleum oil is a naphthene base oil having a viscosity from about 50 to 2000 SUS at 100° F. and about 6 to 7 parts by weight of said extract are mixed with about 3 to 4 parts by weight of water.

References Cited in the file of this patent
UNITED STATES PATENTS

| | | |
|---|---|---|
| 1,898,564 | Muench et al. | Feb. 21, 1933 |
| 2,218,174 | Lazar et al. | Oct. 15, 1940 |
| 2,355,591 | Flaxman | Aug. 8, 1944 |
| 2,650,198 | Kronig et al. | Aug. 25, 1953 |